US009449240B2

(12) United States Patent
Lorenzoni (10) Patent No.: US 9,449,240 B2
(45) Date of Patent: Sep. 20, 2016

(54) METHOD OF DETECTING DATA RELATING TO THERMAL ENERGY RADIATED IN A SCENE USING THE INFRARED RADIATION IMAGE PROCESSING

(71) Applicant: A.M. GENERAL CONTRACTOR S.p.A., Genoa (IT)

(72) Inventor: Giovanni Pietro Lorenzoni, Genoa (IT)

(73) Assignee: A.M. GENERAL CONTRACTOR S.p.A., Genoa (IT)

( * ) Notice: Subject to any disclaimer, the term of this patent is extended or adjusted under 35 U.S.C. 154(b) by 144 days.

(21) Appl. No.: 14/264,715

(22) Filed: Apr. 29, 2014

(65) Prior Publication Data

US 2014/0334674 A1 Nov. 13, 2014

(30) Foreign Application Priority Data

May 9, 2013 (IT) .............................. TO2013A0371

(51) Int. Cl.
| | |
|---|---|
| G06T 7/00 | (2006.01) |
| G06K 9/20 | (2006.01) |
| G08B 17/12 | (2006.01) |
| G08B 29/18 | (2006.01) |
| G06K 9/00 | (2006.01) |
| G08B 13/196 | (2006.01) |

(52) U.S. Cl.
CPC ......... G06K 9/2018 (2013.01); G06K 9/00771 (2013.01); G06K 9/209 (2013.01); G06T 7/0022 (2013.01); G08B 17/125 (2013.01); G08B 29/188 (2013.01); G08B 13/19641 (2013.01)

(58) Field of Classification Search
CPC ...... H04N 7/181; H04N 7/188; G08G 1/166; G06T 7/0012; G06T 2207/30068; G06T 2207/10016; G06T 7/0034; G06T 7/0022
See application file for complete search history.

(56) References Cited

U.S. PATENT DOCUMENTS

| | | | | |
|---|---|---|---|---|
| 5,139,412 A | * | 8/1992 | Kychakoff | .............. F23N 5/082 |
| | | | | 110/186 |
| 5,453,618 A | * | 9/1995 | Sutton | ...................... H04N 3/09 |
| | | | | 250/332 |

(Continued)

FOREIGN PATENT DOCUMENTS

| | | |
|---|---|---|
| EP | 2 037 425 A1 | 3/2009 |
| WO | WO 97/35433 A1 | 9/1997 |
| WO | WO 2011/103915 A1 | 9/2011 |

OTHER PUBLICATIONS

Italian Search Report for corresponding Italian Patent Application No. TO2013A000371 mailed Feb. 13, 2014.

(Continued)

*Primary Examiner* — Matthew Bella
*Assistant Examiner* — Dennis Rosario
(74) *Attorney, Agent, or Firm* — Merchant & Gould P.C.

(57) ABSTRACT

A method of detecting data relating to thermal energy radiated in a scene uses infrared radiation image processing. A sequential plurality of infrared radiation images of the scene are received that consist of at least two sequential series of images simultaneously detected from respective different points of sight (TC1, TC2), arranged in a predetermined geometrical relationship with respect to each other. Each of the images includes a pixel array, each pixel having a value which is representative of a pixel's fraction of the infrared radiation intensity associated with the array of the image. Successive images of the at least two sequential series of images are processed in order to determine a change in at least one thermal parameter that meets predetermined alarm criteria. An event in the environment is detected based on the change determined in the thermal parameter.

8 Claims, 5 Drawing Sheets

(56) References Cited

U.S. PATENT DOCUMENTS

| | | | |
|---|---|---|---|
| 7,831,084 B2* | 11/2010 | Saviharju | G01J 5/0044 110/185 |
| 9,111,148 B2* | 8/2015 | Seow | G06K 9/00771 |
| 2003/0132847 A1 | 7/2003 | Anderson | |
| 2004/0208375 A1 | 10/2004 | Gupta et al. | |

OTHER PUBLICATIONS

Extended European Search Report for corresponding European Patent Application No. 14167611.4 mailed Sep. 17, 2014.

* cited by examiner

METHOD OF DETECTING DATA RELATING TO THERMAL ENERGY RADIATED IN A SCENE USING THE INFRARED RADIATION IMAGE PROCESSING

This application claims benefit of Serial No. TO2013A000371, filed 9 May 2013 in Italy and which application is incorporated herein by reference. To the extent appropriate, a claim of priority is made to the above disclosed application.

BACKGROUND OF THE INVENTION

The present invention relates generally to systems for detecting data relating to thermal energy radiated in a scene using infrared radiation image processing.

In particular, the present invention relates to a method of detecting data relating to thermal energy radiated, comprising the steps of:
- receiving a sequential plurality of infrared radiation images of the scene, each of said images comprising an array of pixels, each pixel having a value which is representative of a pixel's fraction of the infrared radiation intensity associated with the array of the image;
- processing successive images of said sequential plurality of images in order to determine a change in at least one thermal parameter that meets predetermined alarm criteria; and
- detecting an event in the scene on the basis of the change determined in the thermal parameter.

A method of this type, intended in particular for fire detection, is described in US 2003/0132847. According to the method described therein, a region of at least one pixel is determined in an image from a series of images on the basis of the infrared radiation intensity values associated with the pixels, and said region is monitored in several successive images in order to determine a change in said region that meets predetermined alarm criteria.

This known method has the drawback of providing only a two-dimensional representation of the scene and is unable to recognize the position of the objects in the space. This may lead to erroneous evaluations of events; for example, in the case if a heat source of constant dimensions, but arranged on a moving object, for example moving towards one of the infrared radiation sensors, the known method is unable to recognize the approach movement of the heat source, but interprets it as an increase in the dimensions thereof.

SUMMARY OF THE INVENTION

An object of the invention is therefore to provide a method of detecting data relating to thermal energy radiated able to overcome the drawbacks of the state of the art indicated above.

The invention therefore relates to a method of the type defined initially in which said sequential plurality of images consists of at least two sequential series of images simultaneously detected from respective different points of sight arranged in a geometrical relationship with respect to each other, wherein said processing step comprises the steps of:
- associating sub-areas of the arrays of the images with volume sectors of the scene, the position of which within the scene can be determined depending on the position of the sub-areas within the respective arrays of the images detected from the different points of sight, and on the geometrical relationship between the points of sight from which said sequential series of images are detected; and
- calculating said at least one thermal parameter for each of the volume sectors of the scene from the pixel values of the sub-areas of the arrays of the images, and depending on the position of each of the volume sectors with respect to the aforementioned points of sight.

Owing to the fact that the thermal parameters of the environment are calculated taking into account the spatial location of all the points which may be regarded as direct and indirect energy "sources", and in particular their distance from the sensors, the method according to the invention allows dynamic evaluations of the events to be performed, excluding the generation of false alarms of the type mentioned above.

The method according to the invention allows detection of the data relating to thermal energy radiated within a scene, processes the information and may be configured so as to allow implementation of the actions necessary for restoring the scene monitored to a predefined equilibrium state, such as fire suppression actions (in the case of specific rapid increases in energy/temperature) or for maintaining the environmental comfort (in the case of relatively small variations in temperature and/or energy). In this connection, according to the invention "alarm criteria" may be associated with real alarm situations, as in the case of fire-related events, or simply with reduced comfort situations, resulting in the system intervening to regulate the air-conditioning of the scene.

The main actions performed by the method according to the invention may be in particular the following:
1. Analysis of the scene and assignment of reference parameters for the purposes of fire detection and air-conditioning of a scene. Continuous monitoring of the scene and evaluation of the variations in energy, with transfer of the signals to the control (fire prevention and air-conditioning) sub-systems.
2. If a fire is detected, on the basis of the energy measured and the position of the fire detected, the system detects the quantity of extinguishing material needed to restore the safety condition of the system and determines the optimum extinguishing procedures. It then directs the exact quantity of extinguishing material to the delivery devices closest to the fire source via the control of outputs directed to regulating components (for example electrovalves).
3. Monitoring of the energy present in the portions of volume monitored so as to implement, as a microclimate and air-conditioning management system, the appropriate optimization and energy-saving procedures inside the vehicle, modifying the amount of air needed to restore the reference values.

BRIEF DESCRIPTION OF THE DRAWINGS

Further characteristic features and advantages of the method according to the invention will become clear from the detailed description which follows, with reference to the accompanying drawings, provided purely by way of a non-limiting example, in which.

DETAILED DESCRIPTION OF THE PREFERRED EMBODIMENT

Figure 1A:
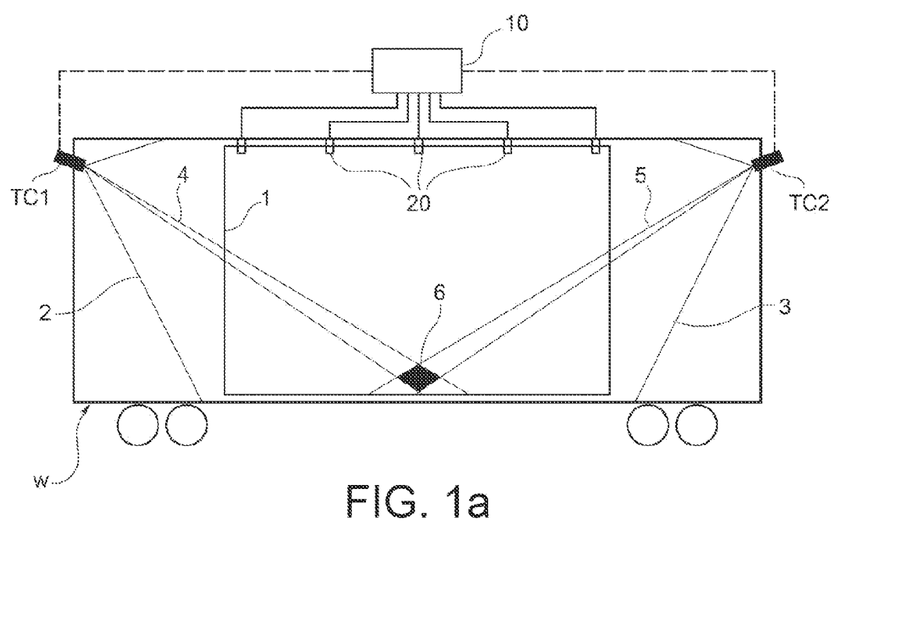
FIG. 1a shows in schematic form a railway carriage provided with an apparatus for implementing the method according to the invention.

With reference to FIG. 1a, this shows in schematic form a control volume 1 to be monitored, for example a part of the internal environment of a railway carriage W. A plurality of infrared radiation sensors are positioned inside the carriage W, outside of the control volume 1 and directed towards it. The sensors are arranged in a predetermined geometrical relationship with each other. In the example shown, the sensors consist of two infrared radiation sensors—indicated by TC1 and TC2—which are arranged in positions opposite each other.

The aforementioned sensors are used to measure the energy irradiated by the solid objects present inside the control volume 1 and have preferably a through-filter for the wavelength spectrum of between 7 and 15 µm. These wavelengths are particularly indicative of the energy emitted and reflected by the objects present in the orientation range of each sensor and allow filtration of all the energy emissions relating to the air and gases which may be present in the scene.

Each infrared radiation sensor comprises an array of sensitive elements (photodiodes) which allow conversion of the energy irradiated by any object present in the volume examined into an electric signal; this signal is processed and decoded in order to define the type of material (substance being examined) and its energy level, including its temperature value in absolute terms. Each photodiode allows a portion of the visual field associated with the optics of the sensor to be monitored. Each of these portions corresponds to a very small solid angle with its centre on the sensor.

The installation of several sensors TC1, TC2 allows the definition of volumetric portions which intersect portions of the visual fields of the various sensors. In this way the monitored volume may be completely broken down into smaller volumetric portions, for each of which both the energy emitted and the exact spatial position may be defined. The visual field portions may be resolved down to the intersection of two solid angles associated with respective single photodiodes of two different sensors. The control volume 1 is completely included inside the respective visual fields 2, 3 of at least two sensors TC1, TC2. The visual field portions 4, 5 form two solid angles centred in the respective sensors and their intersection defines a volumetric portion 6 of the control volume 1. With regard to the latter, it is therefore possible to determine the properties of the irradiated energy and, by means of an alignment reference, its exact location. FIG. 1a also shows a processing and control unit 10 which is operationally connected to the sensors TC1 and TC2 for receiving and processing the images provided by these sensors. The processing and control unit 10 is also operationally connected to delivery devices 20 installed inside the control volume 1 for performing the delivery of extinguishing material (fire prevention function) or processed air (air-conditioning function) when alarm conditions are detected inside the control volume.

Figure 1B:
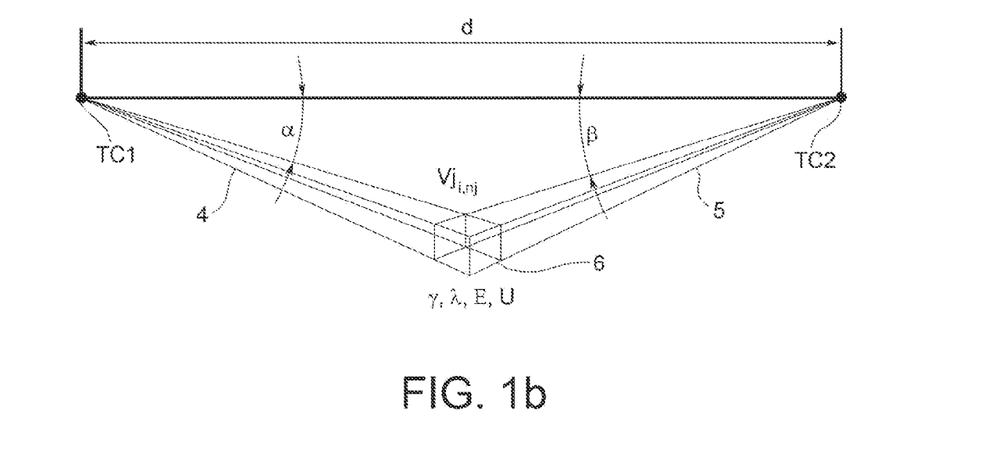
FIG. 1b illustrates schematically the geometrical relationships between a pair of sensors of the apparatus according to FIG. 1a and a volumetric portion of space monitored by them.
Figure 1C:
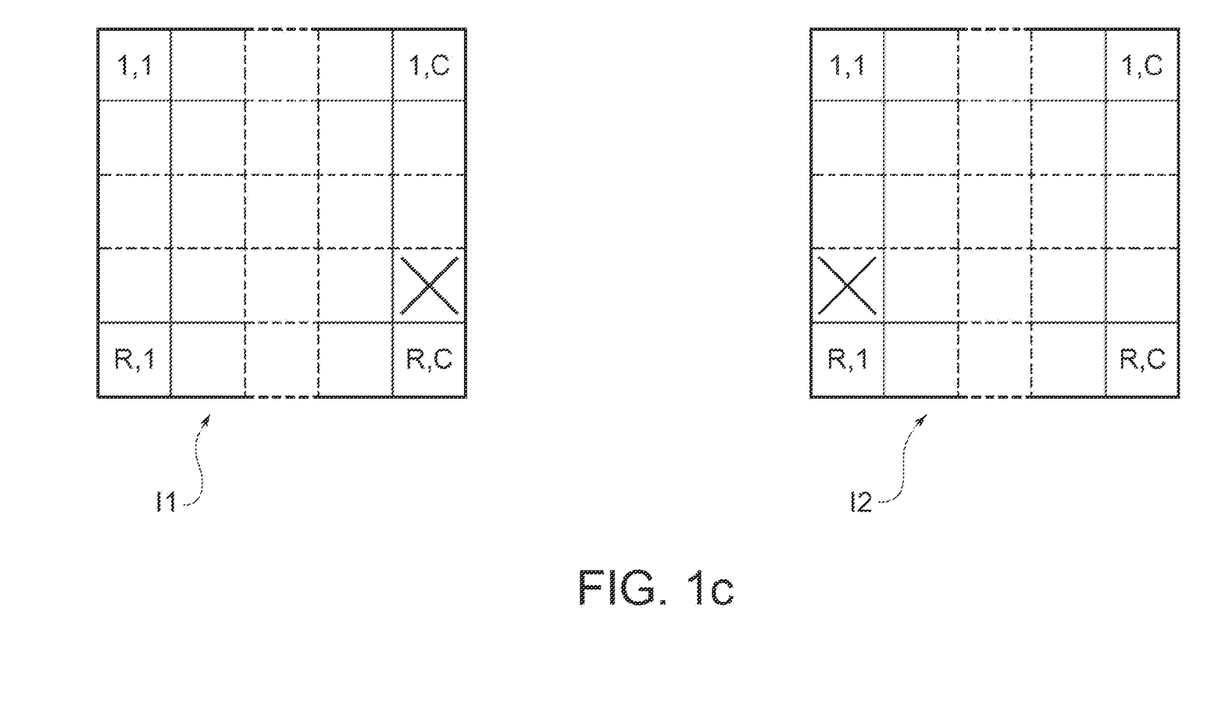
FIG. 1c illustrates schematically an example of association between arrays of images provided by the sensors.

FIG. 1b shows the geometrical relationship between two sensors TC1, TC2, arranged at a distance d from each other, and a given volumetric portion $Vj_{i,nj}$ (the volume Vj is defined as a spatial position by the assigned array values of the sensor n, and coordinates i, j, said coordinates being associated with the array $Tc_{R,C}$ of the various sensors—FIG. 1c) viewed by the two sensors TC1 e TC2: α and β indicate the angle between the lines of sight of the first sensor and second sensor, respectively, and the axis which joins together the two sensors. By determining the position of the volume $Vj_{i,nj}$ within each of the image arrays provided by the two sensors, by means of the aforementioned geometrical parameters it is possible to determine the position of the volume $Vj_{i,nj}$ within the control volume 1.

The breakdown of the visual field of the sensor in order to map the space monitored may thus be performed by subdividing the array of the image supplied by the sensor into sub-areas which may comprise several pixels. In this case each portion of the sensor will monitor the solid angle associated with all its pixels. Each pixel of the array of the image provided by each sensor will therefore have a value which represents a pixel's fraction—"pixel's" in the sense that each pixel forms a basic element of the image—of the intensity of infrared radiation associated with the array of the image in question.

FIG. 1c shows, by way of example, the subdivision of the array of the image I1 provided by the sensor TC1 and the array of the image I2 provided by the sensor TC2 in an array R×C of sub-areas with the same number of pixels. The array of the image is therefore divided into R rows and C columns.

In FIG. 1c, an "X" marked in each of the arrays I1 and I2 indicates a sub-area within which a detail inside the control volume 1, for example the volume $Vj_{i,nj}$, is observed. With regard to the above, based on the position of each sub-area within the respective array, it is possible to calculate the spatial position of the volumetric portion whose image has been recorded by the two sensors.

As a result of the subdivision into sub-areas it is possible to group together the properties of several parts of the volume monitored and carry out a local and global analysis on several levels, e.g.:

Level 1: analysis of specific thermal levels on single pixels

Level 2: analysis of the average thermal levels in the subdivision areas

Level 3: analysis of the average thermal levels over the whole of the sensor array By means of the subdivision of the image array area it is also possible to prioritize the analysis of certain more critical zones, excluding those which are less relevant for the purposes of a thermo-volumetric analysis. The maximum resolution of the array is dependent on the maximum resolution of the sensor.

Each infrared radiation sensor TC1, TC2 receives energy in the form of radiation with given energy intensity and wavelength properties. The electric signal obtained by each single photodiode is interpreted by the processing and control unit 10, thus allowing definition of the energy intensity of the radiation received and its wavelength.

The primary function of the apparatus shown in FIG. 1 is that of detecting the outbreak of fires within the control volume 1 and defining the exact position thereof.

The data measured is sent from each sensor TC1, TC2 to the processing and control unit 10 at a frequency of a few frames (radiation images of the scene) per second, for example 5 frames per second. The processing and control unit 10 therefore receives at least two sequential series of images simultaneously detected from the different viewing points respectively associated with the various sensors.

The values measured by the sensors and associated with each fraction of volume monitored are combined so as to create a three-dimensional map of the thermal parameters. Thermal parameters which allow the system to perform its functions are then associated with each fraction of the control volume 1. The thermal parameters are also compared with the data recorded previously for calculation of the temporal variations of irradiated energy.

For each volume fraction, on the basis of the single readings, the following values are calculated:
a) Thp Maximum energy within the individual volume fraction (expressed as temperature)
b) Tms Average energy within the individual volume fraction (expressed as temperature)
c) Tds Variation of the average energy of the individual volume fraction within the time period of one second (expressed as temperature).

Moreover, the following two values are calculated:
a) Tmg Average energy detected within the whole of the monitored volume (expressed as temperature)
b) Tdg Variation of the average energy of the whole volume monitored within the time period of one second (expressed as temperature).

Knowing the spatial position of the radiation source (energy source) it is therefore possible to direct onto the source, and only thereon, the contrast fluid in quantities sufficient to balance the energy emitted and keep the energy conditions in the scene constant.

In the event of a high energy emission gradient, which is expanding or can be associated with initial combustion of liquid or solid substances, the associated control function calculates the amount of water (or other extinguishing material) able to absorb this energy (the atomized water absorbs a large amount of energy when vaporising).

Figure 2:
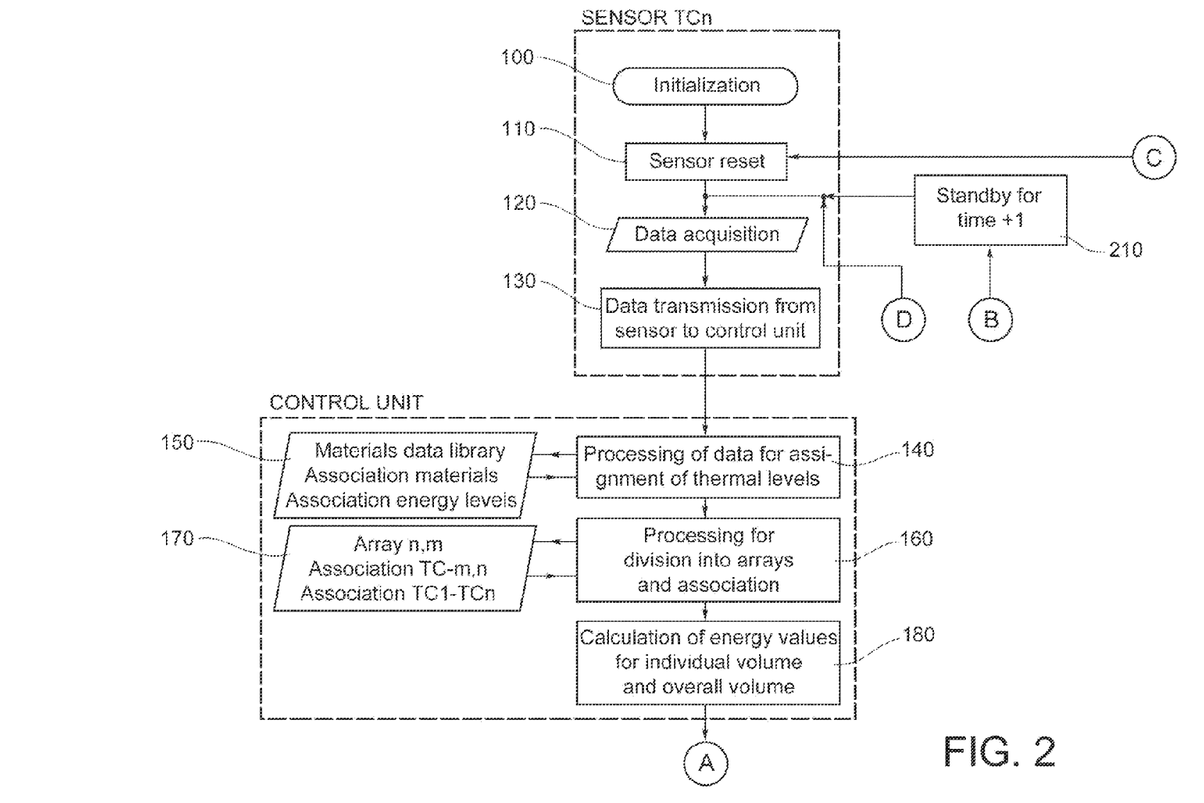
FIGS. 2 to 4 show a flow diagram which illustrates an example of embodiment of the method according to the invention.
Figure 3:
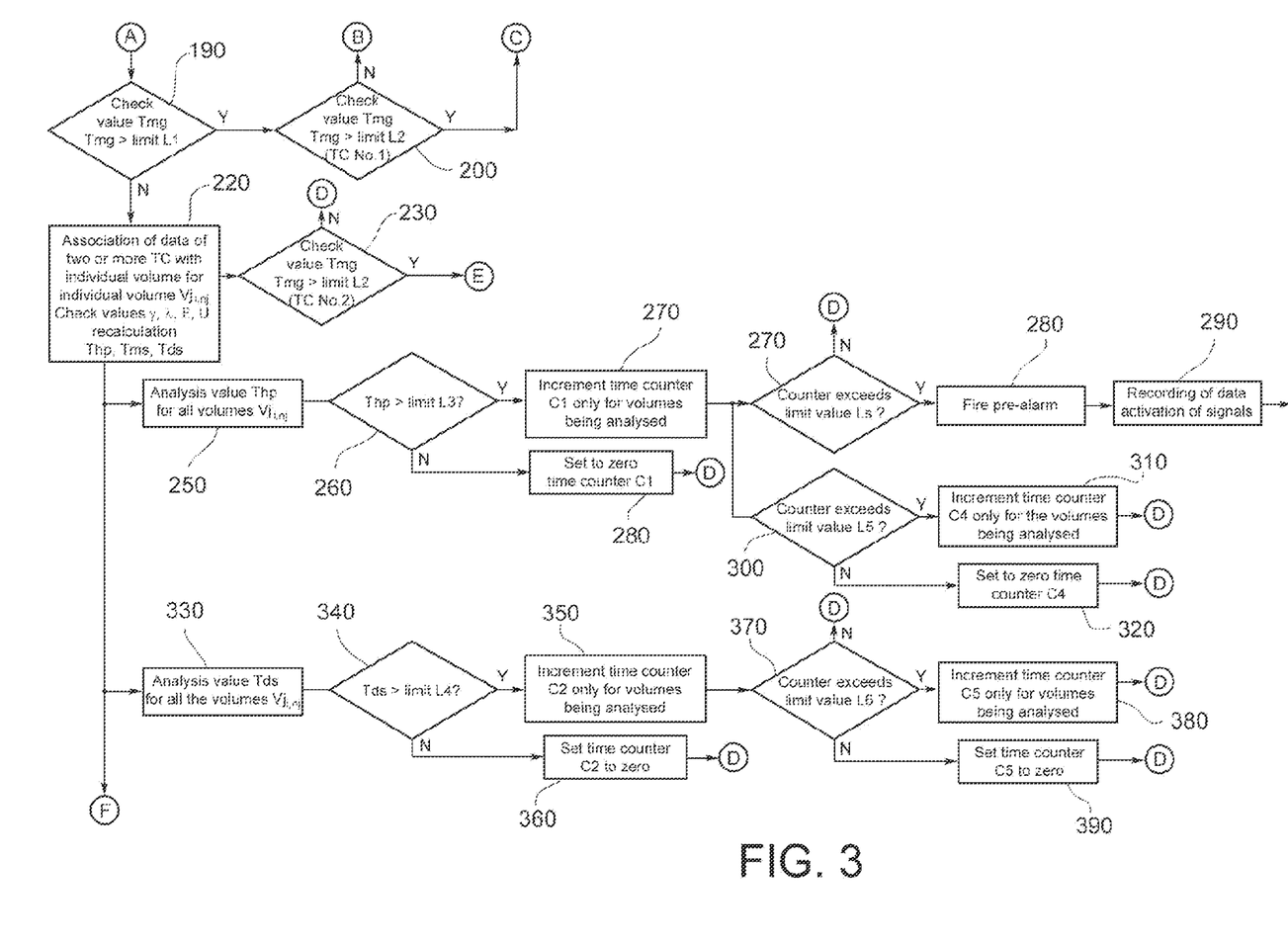
Figure 4:
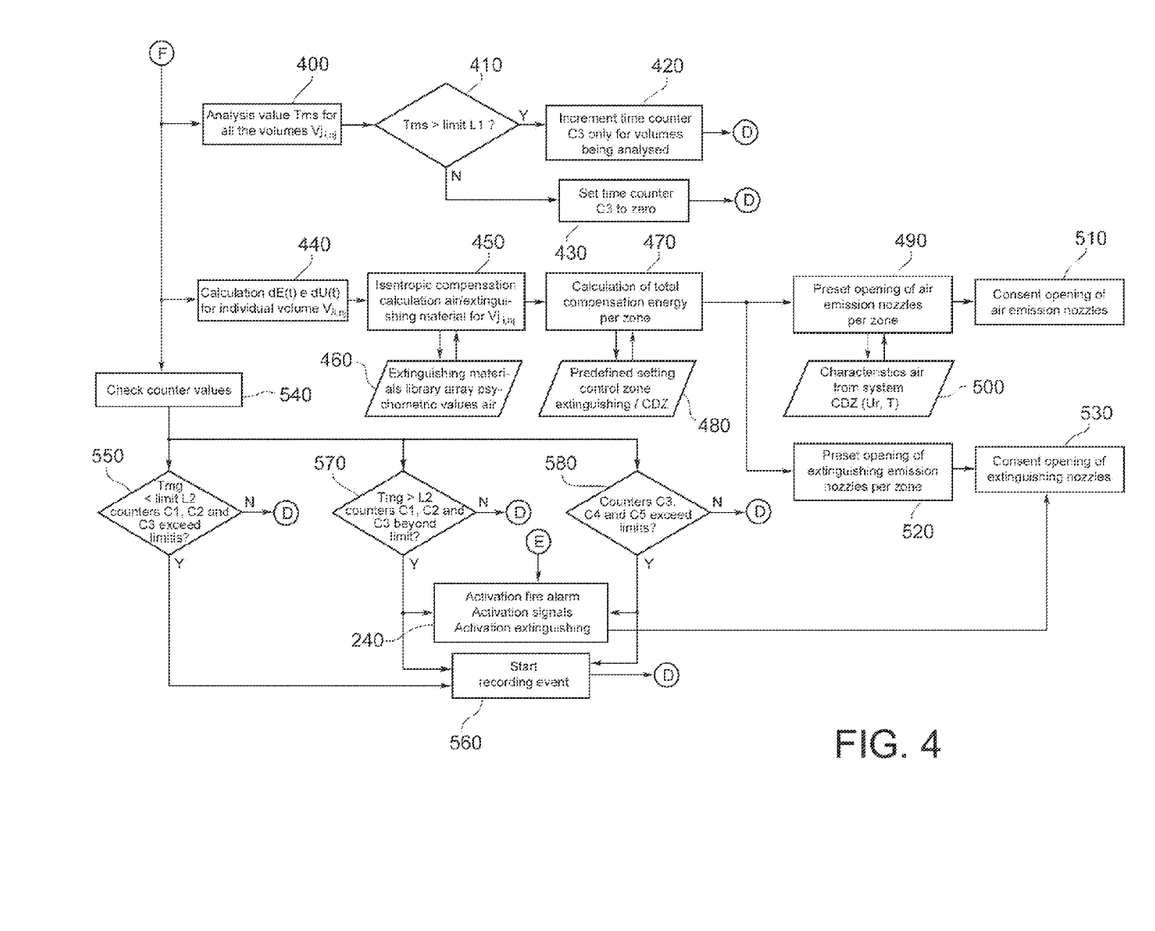

FIGS. 2 to 4 show a flow diagram illustrating an example of implementation of the method according to the invention.

100 denotes a step for start-up of the system, 110 denotes a step for resetting the sensor (during which the internal thermal stability of the device is verified), 120 denotes a data acquisition step, and 130 denotes a step for transmission of data from the sensor to the control unit 10.

The steps 100 to 130 are shown enclosed in a box which indicates that these steps are performed simultaneously by each of the n sensors TC1, Tcn with which the system is equipped. As explained previously, data acquisition is performed a certain number of times per second. The flow diagram shown in FIGS. 2 to 4 therefore illustrates a sequence of operations which is performed a certain number of times per second, for each acquisition of the n sensors.

During the following step, the control unit 10 processes the infrared radiation intensity data in order to assign thermal levels to each single pixel of the image arrays detected by the sensors. For this purpose, the control unit consults a materials data library in order to associate with the signal detected a category of materials (density γ of the material, specific wavelength λ) and an energy level (thermal parameter) with each single pixel (expressed in terms of entropy E and internal energy U). Each thermal parameter is calculated on the basis of the radiation intensity measured by the sensors, taking into account the spatial position of each volumetric fraction and therefore its distance from the single sensors.

In step 160 the data of each single array is processed by means of grouping into the various sub-areas into which each array is subdivided, and the sub-areas are associated with each other and with the individual volumetric fractions of the control volume 1 (step 170) on the basis of the geometrical relationship between the sensors and the individual volumetric fractions monitored by them.

Finally, in step 180, the control unit calculates the overall values of the thermal parameters (entropy and internal energy) for the control volume 1. These values are converted into temperature data Tmg, Tdg (in the case of the latter, by calculating the difference from previously recorded values) on the basis of the known laws of thermodynamics.

Steps 140 to 180 are shown enclosed in a box which indicates that these steps form calculation steps which are performed by the control unit 10 and are intended to associate the image arrays with volume sectors (volumes $Vj_{i,nj}$) and calculate the wavelength λ, the material density γ, the entropy E and the internal energy U of each sector and the total volume; the aforementioned calculated values are used for the successive operations of the processing and control unit 10.

As may be seen below, the flow diagram performs a series of comparisons between the thermal parameters involved and a set of limit values L1 (temperature limit value), L2 (temperature limit value), L3 (temperature limit value), L4 (temperature variation limit value), L5 (time limit value) and L6 (time limit value) and safety limit value L, (time limit value). These limit values are set based on the data known initially and on the development of the combustion phenomena.

Once the calculations indicated above have been performed, in step 190 a check is carried out as to whether the overall average temperature Tmg in the volume monitored is greater than a predetermined limit value L1. If this is the case, it is then checked whether the overall average temperature Tmg in the volume monitored, detected by a single sensor, is greater than a predetermined limit value L2, for example greater than 50° C. (step 200). If this is the case, the sensor in question is reset (step 110). Otherwise, the sensor in question is set to standby for a predetermined time period t1, following which data acquisition is resumed (step 120).

Steps 190 to 230 are intended to avoid the generation of false alarms, which are for example due to a situation in which a source with small and constant dimensions is placed in the immediate vicinity of one of the sensors.

If the outcome of the decisional step 190 is negative (and therefore Tmg <L1), the control unit 10 converts the thermal parameters of the individual volume sectors $Vj_{i,nj}$ into temperature data Thp, Tms, Tds; the differential data Tds is calculated as a variation from the average energy values resulting from previous measurements (step 220).

A check is then carried out as to whether the overall average temperature Tmg in the volume monitored, detected by both sensors, is greater than the aforementioned limit value L2, for example 50° C. (step 230). If this is the case, a fire alarm with the associated signals, together with extinguishing of the fire, is activated (step 240). Otherwise, the following data acquisition step is performed (step 120).

At the same time as the decisional step 230, the control unit 10 performs an analysis of the local maximum temperature value Thp for each of the volume sectors $Vj_{i,nj}$ (step 250). A check is then carried out as to whether Thp is greater than a predetermined limit value L3, for example greater than 120° C. (step 260). If this is the case, a time counter C1 for the volume sector being analysed is incremented (step 270); otherwise, the counter C1 is set to zero (step 280) and the following data acquisition step is performed (step 120). If the counter C1 is instead incremented, the following two checks are carried out in parallel:

in step 270, it is checked whether the counter C1 exceeds the safety limit $L_s$ (for example, 3 s); if this is the case, a fire pre-alarm is activated (step 280) and monitoring of the volume sector in question is performed (step 290), and the following data acquisition step is performed (step 120). Otherwise, the following data acquisition step is performed immediately;

in step 300, it is checked whether the counter C1 exceeds the limit value L5 for example, 3 s. If this is the case, a further time counter C4 is incremented for the volume sector being analysed (step 310) and the following data acquisition step is performed (step 120); otherwise, the counter C4 is set to zero (step 320) and the following data acquisition step is performed (step 120).

At the same time as the step for analysis of the local maximum temperature Thp 250, the control unit 10 also performs an analysis of the local average energy variation value Tds for each of the volume sectors $Vj_{i,nj}$ (step 330). It is then checked whether Tds is greater than a predetermined limit value L4, for example greater than 1° C./s (step 340). If this is the case, a time counter C2 for the volume sector being analysed is incremented (step 350); otherwise, the counter C2 is set to zero (step 360) and the following data acquisition step is performed (step 120). If the counter C2 is instead incremented, it is checked whether the counter C2 exceeds a limit value L6 (step 370). If this is the case, a further time counter C5 is incremented for the volume sector being analysed (step 380) and the following data acquisition step is performed (step 120); otherwise, the counter C5 is set to zero (step 390) and the following data acquisition step is performed (step 120).

At the same time as the step for analysis of the local maximum temperature Thp 250 and the local average variation in temperature Tds 330, the control unit 10 also performs an analysis of the local average temperature value Tms for each of the volume sectors $Vj_{i,nj}$ (step 400). It is then checked whether Tms is greater than the predetermined limit value L1 (step 410). If this is the case, a time counter C3 for the volume sector being analysed is incremented (step 420) and the following data acquisition step is performed (step 120); otherwise, the counter C3 is set to zero (step 430) and the following data acquisition step is performed (step 120).

At the same time as the analyses mentioned above, the control unit 10 also calculates the variations in entropy dE(t) and internal energy dU(t) for each individual volume sector $Vj_{i,nj}$ (step 440), and then the quantity of extinguishing material needed to compensate for this variation, based on a hypothetical isentropic condition. The aforementioned calculation may also be used for air-conditioning purposes, calculating instead the air flow required for isentropic compensation. In any case, the control unit 10 for these calculations obtains the data from a library of extinguishing materials or from a table of psychrometric values of the air (step 460).

The control unit 10 also performs a total energy calculation for compensation of the zone (step 470). A zone is understood as meaning a set of volume sectors which may be served by a single delivery device 20 (see FIG. 1). For the calculation, the control unit 10 reads the data relating to the positioning of the delivery devices (step 480).

For the purpose of air-conditioning, the control unit 10 therefore presets opening of the air emission nozzles for the zone (step 490), depending on the characteristics of the air from the air-conditioning plant, such as relative humidity and temperature (step 500), and gives consent for opening of these nozzles (step 510).

For fire-prevention purposes, the control unit 10 instead presets opening of extinguishing emission nozzles for the zone (step 520) and gives consent for opening of these nozzles (step 530) for activation of extinguishing (step 240).

In the example shown, the procedures for activating fire extinguishing are as follows:

First the values of the counters are checked (step 540).

If the overall average temperature Tmg is less than the limit value L2, and the counters C1, C2 and C3 each exceed the respective limit value (L5, L6), while Thp remains above the time limit value 1 (step 550), recording of the event is activated (step 560) and the following data acquisition step is performed (step 120). Otherwise, the following data acquisition step is performed immediately.

At the same time as the decisional step 550, it is checked whether the counters C1, C2 and C3 each exceed the respective limit value and whether Tmg exceeds the limit value L2 (step 570). If this is the case, the fire alarm is activated (step 240) and recording of the event is performed (step 560). Otherwise, the following data acquisition step is performed (step 120).

At the same time as the decisional steps 550 and 570, it is checked whether the counters C3, C4 and C5 each exceed the respective limit value (step 580). If this is the case, the fire alarm is activated (step 240) and recording of the event is performed (step 560). Otherwise, the following data acquisition step is performed (step 120).

What is claimed is:

1. Method of detecting data relating to thermal energy radiated in a scene using infrared radiation image processing, said method comprising the steps of:

receiving a sequential plurality of infrared radiation images of the scene, each of said images comprising an array of pixels, each pixel having a value which is representative of a pixel's fraction of the infrared radiation intensity associated with the array of the image;

processing successive images of said sequential plurality of images in order to determine a change in at least one thermal parameter that meets predetermined alarm criteria; and detecting an event in the scene based on the change determined in the thermal parameter;

wherein said sequential plurality of images comprises at least two sequential series of images simultaneously detected from respective different points of sight arranged in a predetermined geometrical relationship with respect to each other, wherein said processing step comprises the steps of:

associating sub-areas of the arrays of the images with volume sectors of the scene, the position of the volume sectors within the scene being determined depending on the positions of the sub-areas within the respective arrays of the images detected from the different points of sight and on the geometrical relationship between the points of sight from which said sequential series of images are detected; and calculating said at least one thermal parameter for each of the volume sectors of the scene from the pixel values of the sub-areas of the arrays of the images, depending on the position of each of the volume sectors with respect to said points of sight; wherein said at least one thermal parameter comprises average temperature variation of each volume sector per time unit; and wherein said detecting step comprises calculating variations in entropy and internal energy for each individual volume sector.

2. Method according to claim 1, wherein each of said points of sight is defined by an infrared radiation sensor comprising an array of elements sensitive to the infrared radiation.

3. Method according to claim 1, wherein said different points of sight comprise two points of sight arranged opposite each other.

4. Method according to claim 1, wherein each of said sub-areas of the arrays of the images comprises an array that groups a plurality of said pixels together.

5. Method according to claim 4, wherein said at least one thermal parameter further comprises a plurality of thermal parameters consisting of maximum temperature within each individual volume sector, average temperature within each individual volume sector, overall average temperature of a control volume and variation in the overall average temperature of said control volume.

6. Method according to claim 5, wherein respective time counters are associated with at least some of said thermal parameters, the values of said counters being incremented when, in said processing step, a determination is made that the respective thermal parameters have exceeded a respective limit value.

7. Method according to claim 6, wherein said alarm criteria are defined by limit temperature values, limit temperature increase values and limit count values for said time counters.

8. Apparatus for detecting data relating to thermal energy radiated in a scene using infrared radiation image processing, comprising at least two infrared radiation sensors arranged in said scene in a predetermined geometrical relationship with respect to each other, each of said sensors comprising:

an array of elements sensitive to the infrared radiation, and a control programmed to:

receive a sequential plurality of infrared radiation images of the scene, each of said images comprising an array of pixels, each pixel having a value which is representative of a pixel's fraction of the infrared radiation intensity associated with the array of the image;

process successive images of said sequential plurality of images in order to determine a change in at least one thermal parameter that meets predetermined alarm criteria; and detect an event in the scene based on the change determined in the thermal parameter;

wherein said sequential plurality of images consists of at least two sequential series of images simultaneously detected by the at least two infrared radiation sensors, respectively, wherein said processing step comprises the steps of:

associating sub-areas of the arrays of the images with volume sectors of the scene, the position of which within the scene can be determined depending on the positions of the sub-areas within the respective arrays of the images detected by the infrared radiation sensors and on the geometrical relationship between the infrared radiation sensors; and calculating said at least one thermal parameter for each of the volume sectors of the scene from the pixel values of the sub-areas of the arrays of the images, depending on the position of each of the volume sectors with respect to said infrared radiation sensors, wherein said at least one thermal parameter comprises average temperature variation of each volume sector per time unit; and wherein said detecting step comprises calculating variations in entropy and internal energy for each individual volume sector.

* * * * *